US012706100B2

(12) United States Patent
Yu et al.

(10) Patent No.: US 12,706,100 B2
(45) Date of Patent: Aug. 11, 2026

(54) SPEECH CODEC BASED GENERATIVE METHOD FOR SPEECH ENHANCEMENT IN ADVERSE CONDITIONS

(71) Applicant: TENCENT AMERICA LLC, Palo Alto, CA (US)

(72) Inventors: Meng Yu, Bellevue, WA (US); Hao Zhang, Palo Alto, CA (US); Chunlei Zhang, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 182 days.

(21) Appl. No.: 18/494,492

(22) Filed: Oct. 25, 2023

(65) Prior Publication Data

US 2025/0140265 A1 May 1, 2025

(51) Int. Cl.
*G10L 19/00* (2013.01)
*G10L 19/02* (2013.01)

(52) U.S. Cl.
CPC .......... *G10L 19/0017* (2013.01); *G10L 19/02* (2013.01)

(58) Field of Classification Search
CPC .. G10L 19/0017; G10L 19/02; G10L 19/0208
See application file for complete search history.

(56) References Cited

U.S. PATENT DOCUMENTS

2017/0263260 A1* 9/2017 Hefetz ................ G10L 19/0208
2018/0366138 A1* 12/2018 Ramprashad ....... G10L 21/0208
2023/0223011 A1* 7/2023 Golman .................. G10L 15/16 704/240
2023/0282202 A1* 9/2023 Ahmed .................... G06N 3/02
2023/0326476 A1* 10/2023 Andreev .............. G06N 3/0464

OTHER PUBLICATIONS

Wang, Heming, et al. "Unifying robustness and fidelity: A comprehensive study of pretrained generative methods for speech enhancement in adverse conditions." arXiv preprint arXiv:2309.09028 (2023). (Year: 2023).*

Hu, Yanxin, et al. "DCCRN: Deep complex convolution recurrent network for phase-aware speech enhancement." arXiv preprint arXiv:2008.00264 (2020). (Year: 2020).*

International Search Report issued Aug. 1, 2024 in International Application No. PCT/US 24/24329.

Written Opinion issued Aug. 1, 2024 in International Application No. PCT/US 24/24329.

(Continued)

*Primary Examiner* — Anne L Thomas-Homescu
(74) *Attorney, Agent, or Firm* — Sughrue Mion, PLLC

(57) ABSTRACT

A method and apparatus comprising computer code configured to cause a processor or processors to receive an audio signal obtained from a microphone, input the audio signal into a neural-network pipeline, the neural-network pipeline including a convolutional network that receives the audio signal and provides a first output of the convolutional network to an enhancer, the enhancer including a deep complex convolutional recurrent network that receives the first output along with a mel spectrogram of the audio signal and outputs a second output to at least one of a vocoder and a decoder, and control an output of an enhanced audio signal from the at least one of the vocoder and the decoder.

20 Claims, 13 Drawing Sheets

1100

(56) References Cited

OTHER PUBLICATIONS

Heming Wang, et al., "Unifying Robustness and Fidelity: a Comprehensive Study of Pretrained Generative Methods for Speech Enhancement in Adverse Conditions", arXiv:2309.09028v1, Sep. 16, 2023 (5 pages total) Accessed via the Internet: URL: https://arxiv.org/abs/2309.09028.
Deliang Wang, et al., "Supervised Speech Separation Based on Deep Learning: An Overview", IEEE, pp. 1-27.
Xiaofei Li, et al., "Online Monaural Speech Enhancement Using Delayed Subband LSTM" HAL Open Science, Oct. 2020, pp. 2462-2466.
Yanxin Hu, et al., "DCCRN: Deep Complex Convolution Recurrent Network for Phase-Aware Speech Enhancement", Audio, Speech and Language Processing Group, Sep. 23, 2020, p. 1-5.
Ashutosh Pandey, et al., "Dense CNN With Self-Attention for Time-Domain Speech Enhancement", IEEE/ACM Transactions on Audio, Speech, and Language Processing, 2021, pp. 1270-1279, vol. 29.
Andong Li, "Two Heads are Better Than One: A Two-Stage Complex Spectral Mapping Approach for Monaural Speech Enhancement", IEEE/ACM Transactions on Audio, Speech, and Language Processing, 2021, pp. 1829-1843, vol. 29.
Heming Wang, et al., "Neural Cascade Architecture With Triple-Domain Loss for Speech Enhancement", IEEE/ACM Transactions on Audio, Speech, and Language Processing, 2022, pp. 734 to 743, viol. 30.
Heming Wang, et al., "Cross-Domain Diffusion Based Speech Enhancement for Very Noisy Speech", ICASSP, 2023, pp. 1-5.
Jean-Marie Lemercier, et al., StoRM: A Diffusion-based Stochastic Regeneration Model for Speech Enhancement and Dereverberation, IEEE, Dec. 2022, pp. 1-11.
Haohe Liu, et al., "VoiceFixer: A Unified Framework for High-Fidelity Speech Restoration", Centre for Vision, Speech and Signal Processing (CVSSP), Apr. 17, 2022, pp. 1-5.
Jungil Kong, et al., "HiFi-GAN: Generative Adversarial Networks for Efficient and High Fidelity Speech Synthesis", $34^{th}$ Conference on Neural Information Processing Systems (NeurIPS 2020), Vancouver, Canada, pp. 1-12.
Zhi Zhong, et al., "Extending Audio Masked Autoencoders Toward Audio Restoration", Sony Group Corporation, Aug. 17, 2023, pp. 1-5.
Zalán Borsos, et al., "AudioLM: a Language Modeling Approach to Audio Generation", Google Research, Jul. 26, 2023, pp. 1-11.
Chengyi Wang, et al., "Neural Codec Language Models are Zero-Shot Text to Speech Synthesizers", https://github.com/microsoft/unllm, Jan. 5, 2023, pp. 1-16.
Yuchen Hu, et al., "Wav2code: Restore Clean Speech Representations via Codebook Lookup for Noise-Robust ASR", IEEE/ACM Transactions on Audio, Speech, and Language Processing, Apr. 23, 2023, p. 1-12.
Sanyuan Chen, et al., WavLM: Large-Scale Self-Supervised Pre-Training for Full Stack Speech Processing, https://arxiv.org/pdf/2110.13900.pdf, Jun. 17, 2022, pp. 1-14.
Guoguo Chen, et al., "GigaSpeech: An Evolving, Multi-domain ASR Corpus with 10,0000 Hours of Transcribed Audio", https://github.com/SpeechColab/GigaSpeech, Jun. 13, 2021, pp. 1-5.
Alexandre Défossez, et al., "High Fidelity Neural Audio Compression", https://arxiv.org/pdf/2210.13438.pdf, Oct. 24, 2022.
Heiga Zen, et al., "LibriTTS: A Corpus Derived from LibriSpeech for Text-to Speech", Google AI, heigazen@google.com; Apr. 5, 2019, pp. 1-7.
Rosana Ardila, et al., "Common Voice: A Massively-Multilingual Speech Corpus", http://voice.mozilla.org; Mar. 5, 2020, pp. 1-5.
Eric Jang, et al., "Categorical Reparameterization With Gumbel-Softmax", Conference paper at ICLR 2017, Aug. 5, 2017, pp. 1-13.
Cees H. Taal, et al., "An Algorithm for Intelligibility Prediction of Time-Frequency Weighted Noisy Speech", IEEE Transactions on Audio, Speech, and Language Processing, pp. 2125-2136, Sep. 2011, vol. 19, No. 7.

* cited by examiner

FIG. 9

900

Algorithm Streaming inference process.

procedure STREAMING($(y, r) \rightarrow \hat{s}$) ▷ $r$: reference signal
  Initialization: $\mathbf{y}_{\texttt{buffer}}$, $\mathbf{r}_{\texttt{buffer}}$, load DNN model: $f(\cdot)$
  Parameters: Delay: $\Delta t$, gain: $G$, nonlinearity: $NL(\cdot)$
  while $m \leq M$ do ▷ $M$ is the total number of frames
    $\hat{s}_m \leftarrow f(\mathbf{y}_{\texttt{buffer}}, \mathbf{r}_{\texttt{buffer}})$ ▷ Get output at frame $m$
    $\hat{s} \leftarrow \hat{s}_m$ ▷ Save to final output
    $x_{m+1} \leftarrow$ Delayed_$\hat{s}_m \cdot G$ ▷ Get loudspeaker signal
    $d_{m+1} \leftarrow NL(x_{m+1}) * h$ ▷ Get next playback
    $\mathbf{y}_{\texttt{buffer}} \leftarrow d_{m+1} + s_{m+1} + n_{m+1}$ ▷ Update input
    $\mathbf{r}_{\texttt{buffer}} \leftarrow \mathbf{y}_{\texttt{buffer}}$ ▷ Update reference signal
  end while
  return $\hat{s}$ ▷ The streaming output is $\hat{s}$
end procedure

1000

1200

SPEECH CODEC BASED GENERATIVE METHOD FOR SPEECH ENHANCEMENT IN ADVERSE CONDITIONS

BACKGROUND

1. Field

The present disclosure is directed to speech coded based generative methods for speech enhancement in adverse conditions.

2. Description of Related Art

Enhancing speech signal quality in adverse acoustic environments is a persistent challenge in speech processing. Existing deep learning based enhancement methods often struggle to effectively remove background noise and reverberation in real-world scenarios, hampering listening experiences.

In real-world scenarios, speech signals are often degraded by background noise and room reverberation, leading to diminished clarity and comprehensibility. The main aim of speech enhancement is to mitigate the impact of such environmental disturbances. The development of deep neural networks (DNN) has greatly advanced speech enhancement research. DNNs have shown remarkable proficiency in suppressing background noise and reverberation, yielding enhancement results. DNN-based enhancement techniques primarily focus on direct speech signal representations, aiming to establish mappings from noisy inputs to their corresponding clean targets. These representations include magnitude, complex spectrograms, waveforms, or a fusion of these features which are all intrinsically associated with the signals. However, performance often notably deteriorates in real-world complicated scenarios.

In attempts at addressing these challenges, recent studies have aimed to leverage the potential of pre-trained models. Some researchers utilized diffusion models to refine speech, employing them to regenerate clean speech based on enhanced priors acquired through pre-trained discriminative models. Another avenue of investigation involves employing speech vocoders for speech resynthesis. For instance, VoiceFixer was proposed to address general speech restoration. It employs an enhancement model on-spectrograms and subsequently utilizes the HifiGAN vocoder to resynthesize the clean speech. Similarly, it has been proposed to use masked autoencoders for speech restoration and to employ mel-to-mel mapping during pretraining to restore masked audio signals.

The majority of existing research related to speech codecs is primarily centered around text-to-speech tasks, relying heavily on text embeddings to ensure input stability. Furthermore, a relevant contribution by Wav2code has also introduced the utilization of codebooks to enhance the resilience of speech representations. Notably, Wav2code focuses more on improving robust automatic speech recognition and operates on self-supervised learning (SSL) embeddings.

Nonetheless, despite effectiveness of powerful enhancement baselines, their performance often notably deteriorates in real-world complicated scenarios. For example, the enhanced speech obtained by supervised learning based models in such challenging scenarios may retain strong noise or reverberation, and be accompanied by distortions and artifacts. And for any of those reasons there is therefore a desire for technical solutions to such problems that arose in computer audio technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive an audio signal obtained from a microphone; inputting code configured to cause the at least one processor to input the audio signal into a neural-network pipeline, the neural-network pipeline comprising a convolutional network that receives the audio signal and provides a first output of the convolutional network to an enhancer, the enhancer comprising a deep complex convolutional recurrent network that receives the first output along with a mel spectrogram of the audio signal and outputs a second output to at least one of a vocoder and a decoder; and controlling code configured to cause the at least one processor to control an output of an enhanced audio signal from the at least one of the vocoder and the decoder.

According to aspects of the disclosure, the vocoder may be a HifiGAN vocoder.

According to aspects of the disclosure, the first output may be based on a WavLM-Large variant of an WavLM model which extracts a learnable weighted sum of layered results and produces a 1024-dimension self-supervised learning (SSL) features from which SSL embeddings of 256 dimensions are extracted by an SSL conditioner of the neural-network pipeline.

According to aspects of the disclosure, the SSL conditioner may include a three-layer 1-dimensional convolutional network, as the convolutional network, comprising upsampling, rectified linear unit activation, instance normalization, and a dropout of 0.5.

According to aspects of the disclosure, the deep complex convolutional recurrent network may include an encoder-decoder with a long short-term memory (LSTM) bottleneck, and According to aspects of the disclosure, the encoder-decoder may include a six-layer convolutional network.

According to aspects of the disclosure, the neural-network pipeline may include a model trained on utterances from multiple languages.

According to aspects of the disclosure, the utterances may include augmentations of simulated noise and reverberations.

According to aspects of the disclosure, encoder embeddings and the mel spectrogram may be inputs to the model during training of the model.

According to aspects of the disclosure, neural-network pipeline may include a decoder comprising 12 transformer blocks characterized by an embedding dimension of 512.

According to aspects of the disclosure, a prediction layer of the neural-network pipeline may include projection of transformer outputs to 1024 dimensions as corresponding to a size of a codebook vocabulary of the neural-network pipeline.

BRIEF DESCRIPTION OF THE DRAWINGS

Further features, nature, and various advantages of the disclosed subject matter will be more apparent from the following detailed description and the accompanying drawings in which:

FIG. 9 is a simplified illustration in accordance with embodiments;

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
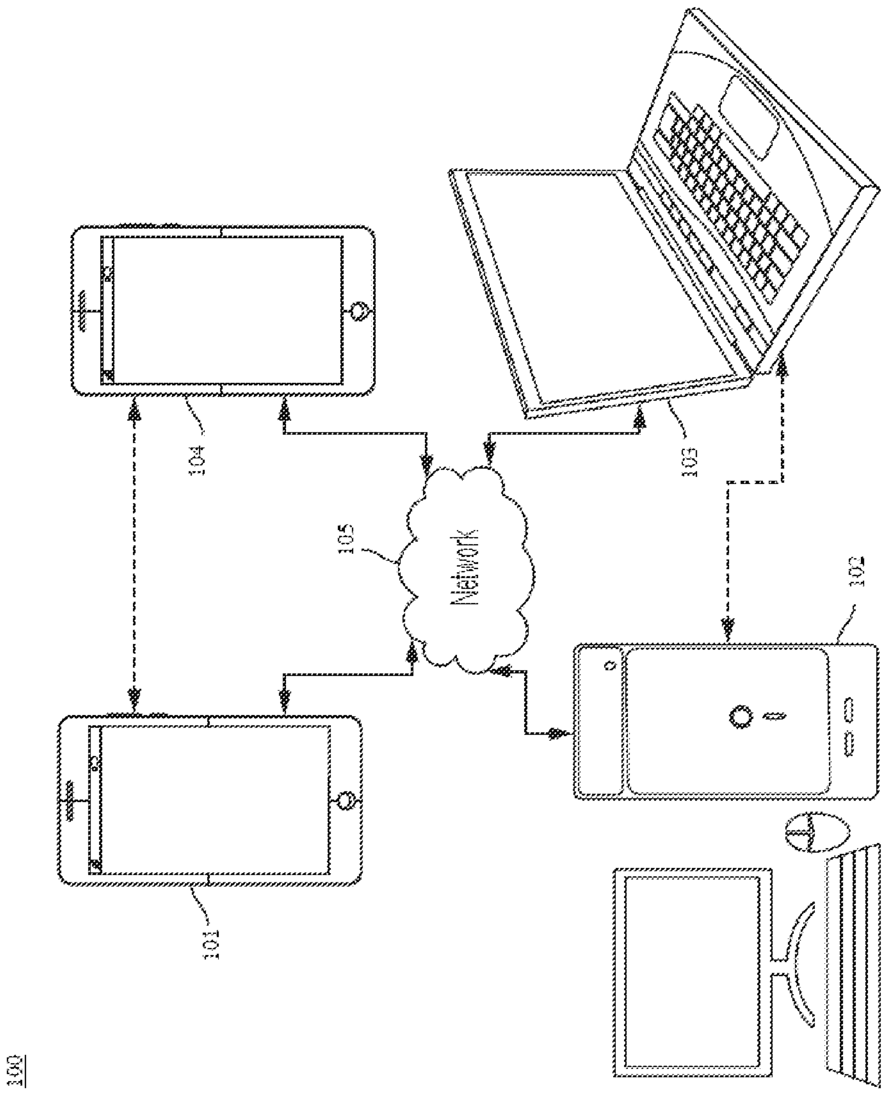
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
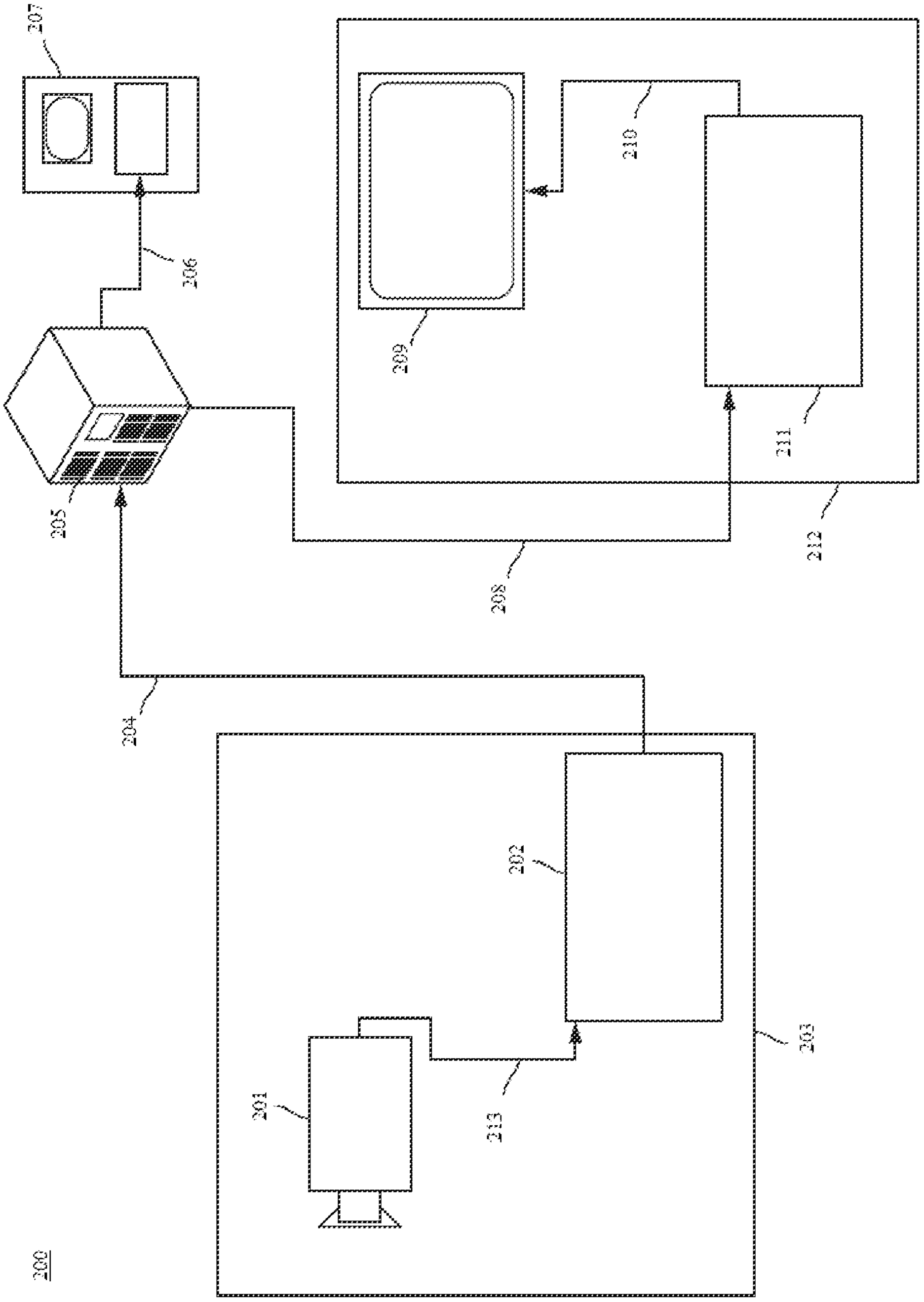
FIG. 2 is a simplified block diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
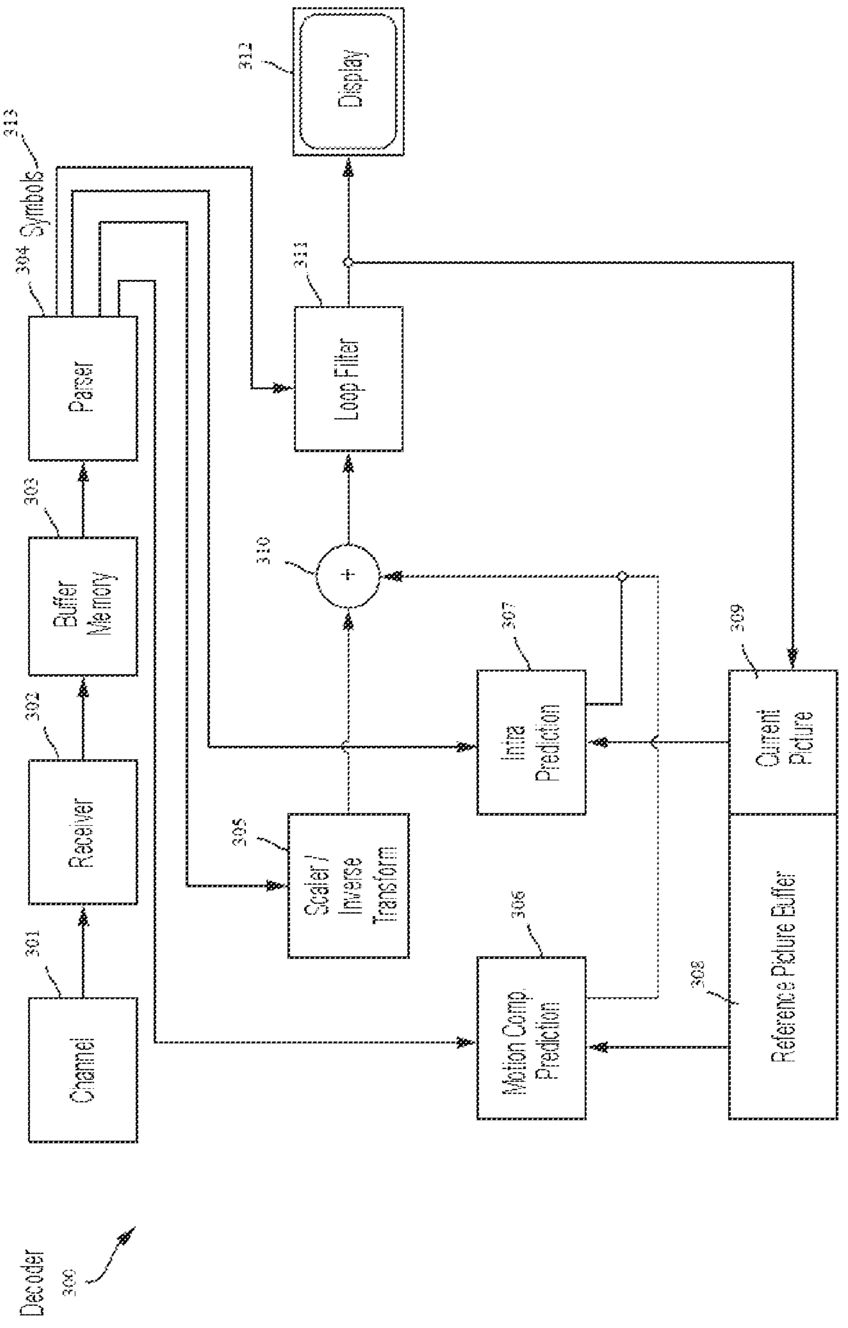
FIG. 3 is a simplified illustration in accordance with embodiments.

FIG. 3 may be a functional block diagram of a video decoder 300 according to an embodiment of the present disclosure.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Embodiments herein may be applied in such environments, such as 2 or more dimensional video conferencing, or hearing aids or karaoke environments or theatre environments or the like that may experience acoustic deterioration.

Considering that deep learning is powerful at modeling complex nonlinear relationships and has been successfully introduced to suppress acoustic deterioration, embodiments herein employ deep learning to also serve as a powerful tool.

Figure 4:
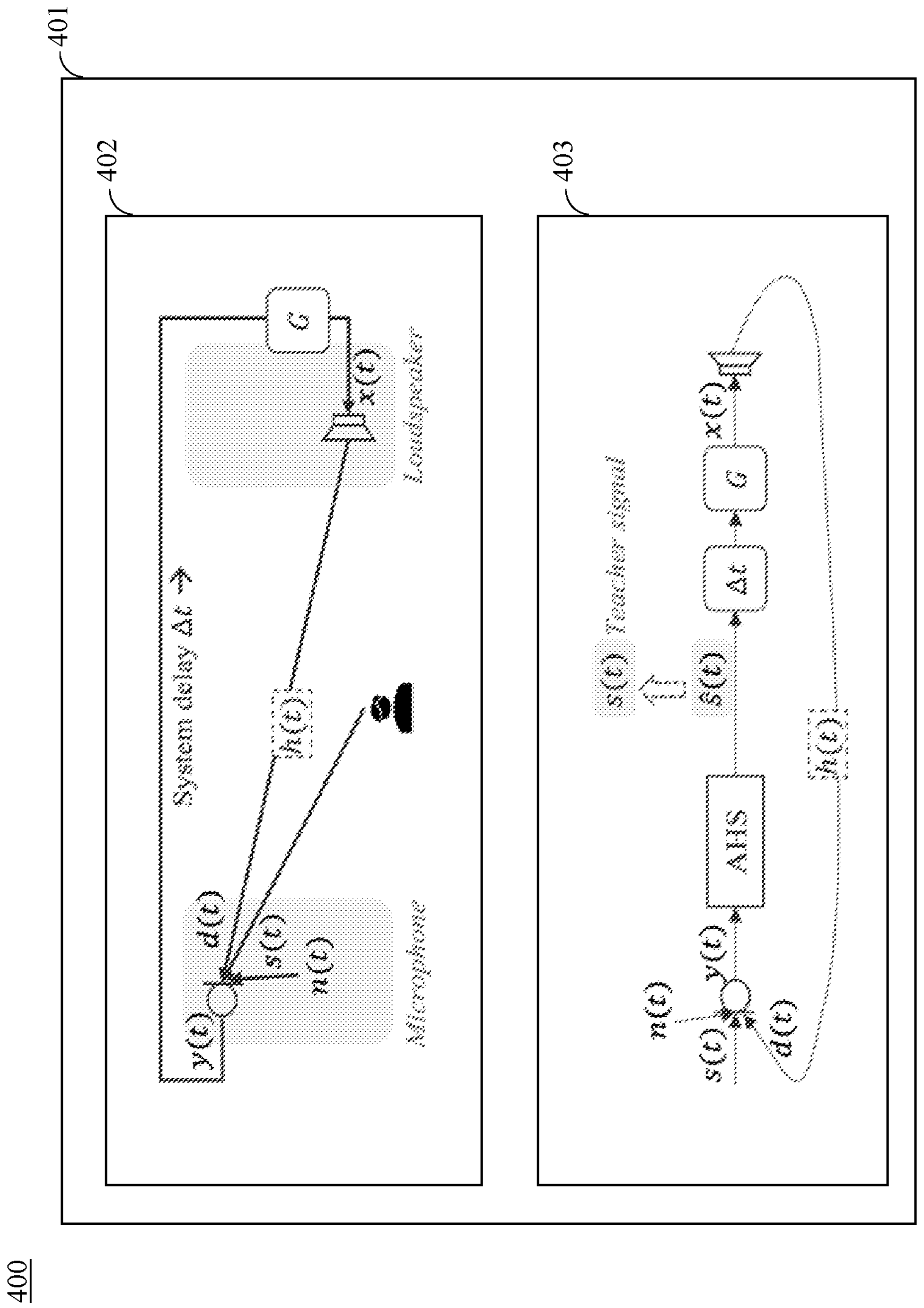
FIG. 4 is a simplified illustration in accordance with embodiments.

FIG. 4 illustrates an example 400 of a single-channel acoustic amplification system 401 with a microphone and a loudspeaker coupled in the same space 402. The target speech is picked up by the microphone as s(t), which is then sent to the loudspeaker for acoustic amplification. The loudspeaker signal x(t) is played out and arrives at the microphone as a playback signal denoted as d(t):

$$d(t) = NL(x(t)) * h(t) \quad \text{Eq. (1)}$$

where NL(•) denotes the nonlinear distortion introduced by the loudspeaker, h(t) represents the acoustic path from loudspeaker to microphone, and * denotes linear convolution.

FIG. 4 also illustrates the signal flow 403 of an acoustic deterioration suppression system according to embodiments herein. For example, if without any processing, the loudspeaker signal x(t) will be a delayed and amplified version of y(t), and this playback signal d(t) will re-enter the pickup repeatedly, the corresponding microphone signal at time index t can be represented as:

$$y(t) = s(t) + n(t) + NL[y(t - \Delta t) \cdot G] * h(t) \quad \text{Eq. (2)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound, which is known as a form of acoustic deterioration.

With that being said, howling is generated in a recurrent manner rather than instantaneously. That is, howling starts as multiple playback signals and gradually forms a shrill sound after being amplified to a certain extent.

As a note acoustic howling is different from another form of acoustic deterioration, acoustic echo, even though inappropriately handled acoustic echo (leakage) could also result in howling. Major differences between acoustic howling and acoustic echo include that both are essentially playback signals, while howling is generated gradually, and the playback signal that leads to howling is generated from the same source as that of the target signal whereas acoustic echo is usually generated from a different source (far-end speaker), which makes the suppression of howling more challenging.

Figure 5:
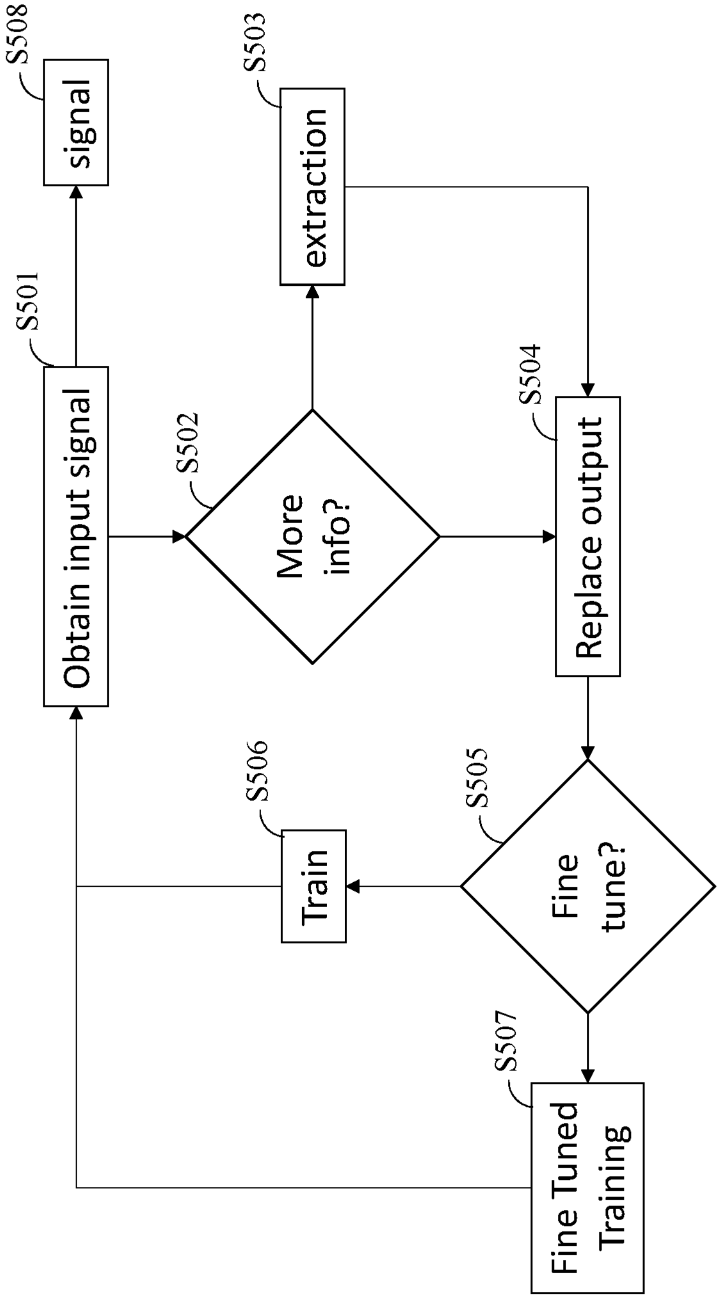
FIG. 5 is a simplified flow diagram in accordance with embodiments.

FIG. 5 represents an example flowchart 500 regarding an embodiment of teacher-forced learning for acoustic deterioration suppression. Ideally, if acoustic deterioration suppression methods can always perfectly process microphone recording and completely attenuates the playback component in it before sending it to the loudspeaker, there will be no howling problem under any circumstances. From the speech separation point of view, it seems that acoustic deterioration suppression can be seen as a speech separation problem where the target signal s(t) is a source to be separated from the microphone signal, which is similar to the idea of how deep learning based acoustic deterioration suppression is formulated.

However, to achieve acoustic deterioration suppression using deep learning considering the characteristics of acoustic deterioration, a most crucial problem is that acoustic deterioration is generated adaptively, and the current input depends on the previous outputs. Specifically, the existence of distortion/leakage in the current processed signal as shown in signal flow 403, will affect the playback signal received at the microphone in the next loop d(t+Δt). Ideally, there may be training of a deep learning model in an adaptive way by updating its parameters on a sample level. However, this requires a huge amount of computation and is hard to be realized in real applications.

As such, embodiments herein employ Deep learning to train a model for acoustic deterioration suppression using teacher-forced learning. Assuming that once the model is properly trained, it should attenuate the playback signal in the microphone and send only target speech to the loudspeaker. During model training, embodiments take the target speech, s(t), as the teacher signal to replace the actual output ŝ(t) in the subsequent computation of the network, as shown in signal flow 403.

By using teacher forced learning, the playback signal d(t) is then a determined signal influenced only by s(t), and the repeating summation of multiple playback signals in Eq. (2) can be simplified to a one-time playback. The corresponding microphone signal for model training can be written as:

$$y(t) = s(t) + n(t) + NL[s(t - \Delta t) \cdot G] * h(t) \quad \text{Eq. (3)}$$

The microphone signal during teacher forced learning is a mixture of the target signal, background noise, and a determined one-time playback signal. And the overall problem can thus be formulated as a speech separation problem. Training Deep in a teacher-forced learning way not only simplifies the overall problem but also possible to diminish the uncertainty introduced in the adaptive process of acoustic deterioration suppression and results in a robust howling suppression solution.

According to exemplary embodiments, different training strategies have been explored according to embodiments herein. An example of a straightforward embodiment is to directly use the microphone signal in Eq. (3) as input at S501 and set the corresponding s(t) as the training target at S504. Such training strategy may be employed as the model trained at S506 without using a reference signal ("w/o Ref").

Another embodiment involves extracting more information at S502 from input and using that additional extracted information as a reference signal during model training. Therefore, embodiments use a delayed microphone signal as additional input at S503 with the amount of delay estimated during an initial stage. Considering that the playback signal can be regarded as a delayed, scaled, nonlinear version of s(t), using a delayed microphone signal helps the model to better differentiate the target signal from playback. Such embodiment of a training strategy may be referred to as "w Ref".

In addition, there may be situations where there is always a mismatch during offline training and real-time application considering the leakage existed in ŝ(t). To incorporate the mismatch and better approximate the real scenarios, embodiments employ another strategy that works by fine-tuning at S505 and S507 the model using pre-processing signals, denoted as "Fine-tuned". Then, the microphone signal for offline training is a modified version of Eq. (3):

$$y'(t) = s(t) + d'(t) + n(t) \quad \text{Eq. (4)}$$

where d'(t) is the distorted playback signal generated using estimated target ŝ(t−Δt). To be specific, there may be pre-processing of all the training data using a pre-trained model and then the enhanced output may be fed through the audio system to get the corresponding playback d'(t). Finally, there may be fine-tuning of the model using y'(t) as input. As such, the mismatch mentioned previously would be reduced slightly given that the model has seen the distortion during training.

By any of the above-described embodiments, acoustic deterioration suppression of a signal may be achieved, to varying degrees, at S508 depending on one or more of those embodiments.

Figure 6:
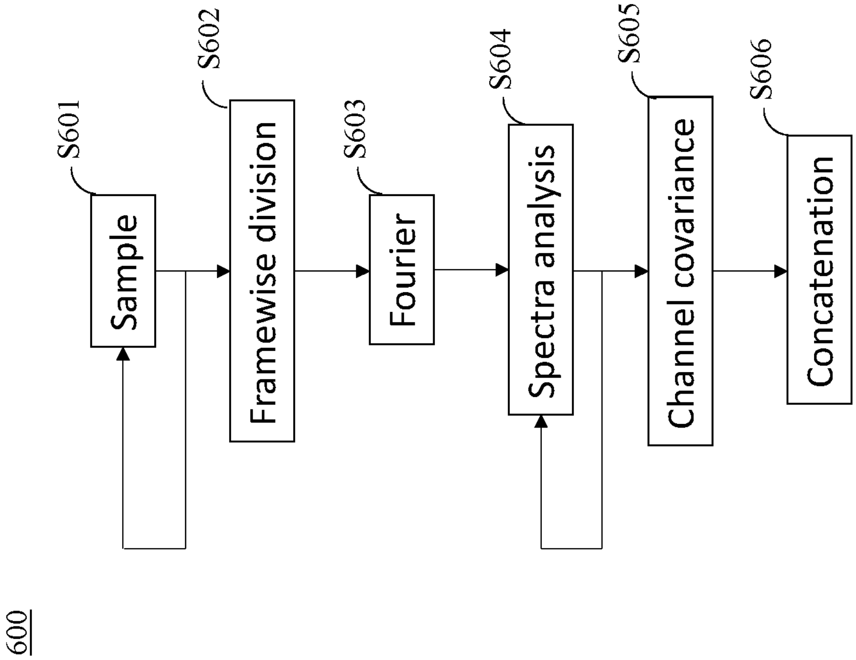
FIG. 6 is a simplified flow diagram in accordance with embodiments.
Figure 7:
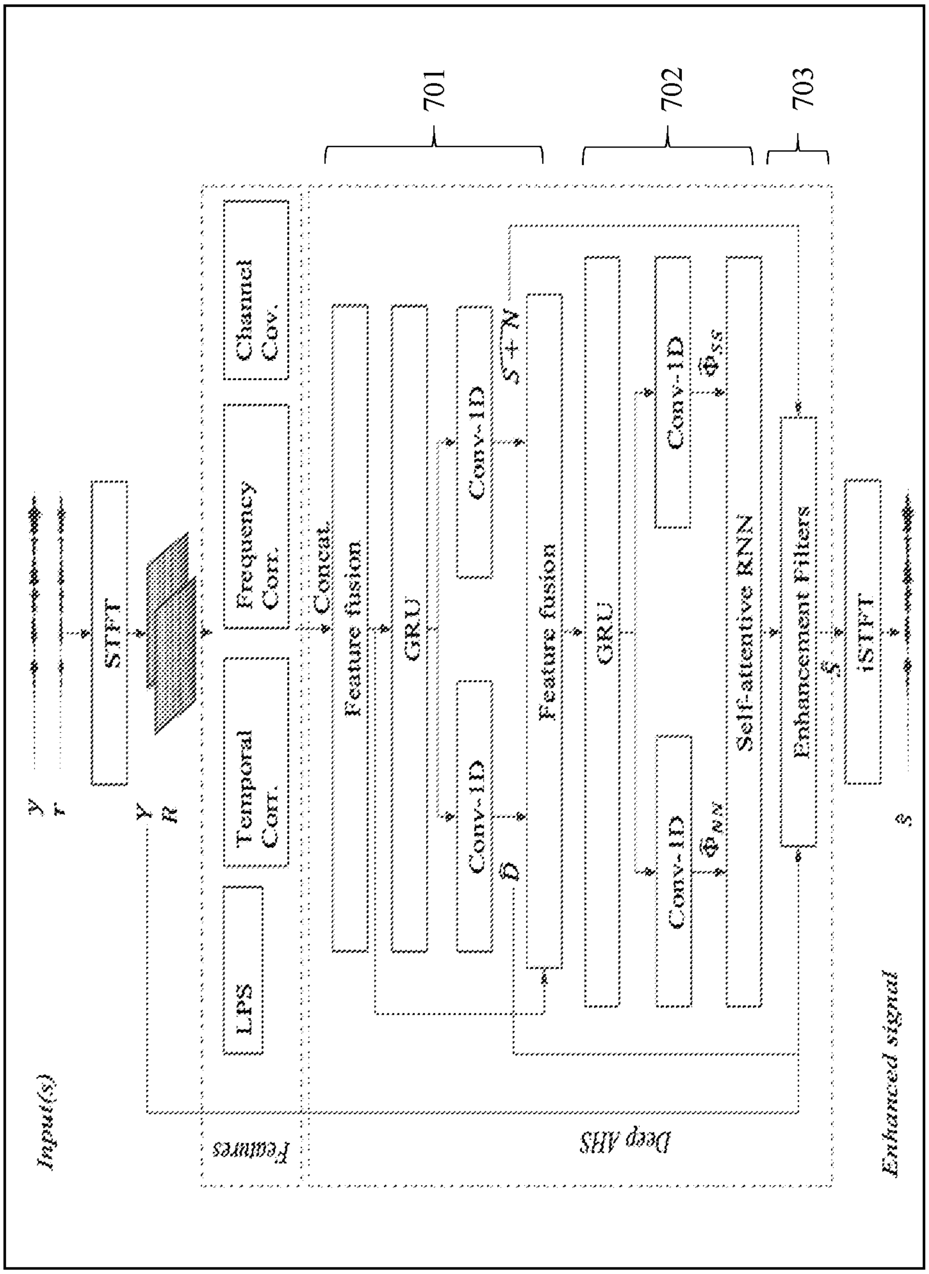
FIG. 7 is a simplified illustration in accordance with embodiments.

Details of a network structure are illustrated and described with the example 700 of FIG. 7 and the flowchart 600 of FIG. 6. The microphone signal y(t) and reference signal r(t), sampled at 16 k Hz at S601, are firstly divided into 32-ms frames with 16 ms frameshift at S602. A 512-point short-time Fourier transform (STFT) is then applied at S603 to each frame, resulting in the frequency domain inputs, Y(m,f) and R(m,f), with frame index m and frequency index f, respectively. Then a normalized log-power spectra (LPS) may be calculated at S604 along with a correlation matrix across time frames and frequency bins of microphone (log $(|Y|^2)$, $\Phi^T$_Y, $\Phi^F$_Y) and reference signals (log$(|R|^2)$, $\Phi^T$_R, $\Phi^F$_R), respectively, as input features. Where $\Phi^T$_* and $\Phi^F$_* are used to capture the signals' temporal and frequency dependency, which helps discriminate between howling and tonal components. Channel covariance of input signals $\Phi^C$ is calculated at S605 as another input feature to account for cross-correlation between them. A concatenation of these features is used at S606 for model training with a linear layer for feature fusion.

Figure 8:
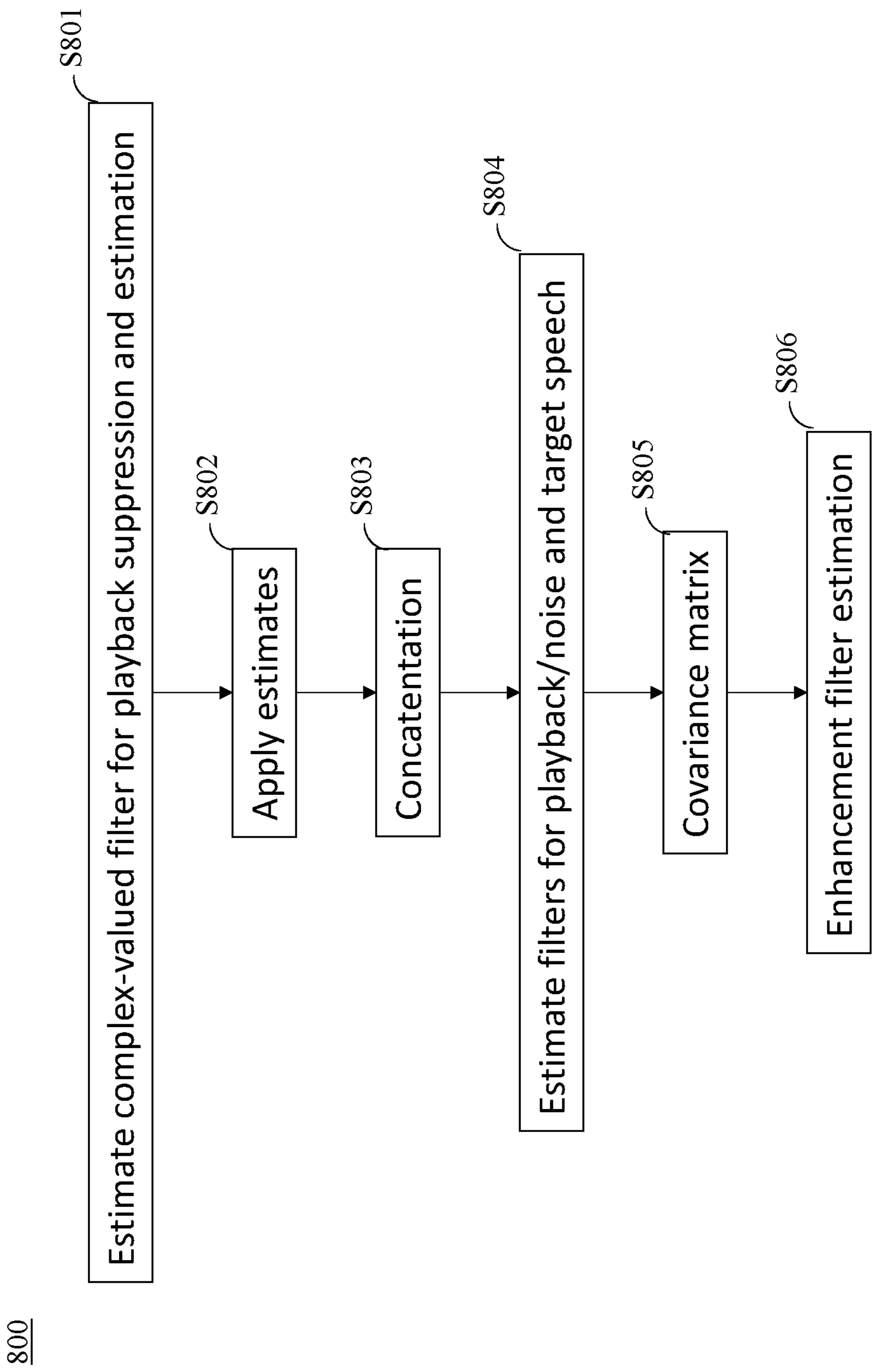
FIG. 8 is a simplified flow diagram in accordance with embodiments.

FIG. 8 illustrates a flowchart 800 regarding an architecture of Deep learning for acoustic deterioration suppression according to embodiments of the disclosure. For example, as shown in example 700, the network consists of three parts, where the first part 701 employs a gated recurrent unit (GRU) layer with 257 hidden units and two 1D convolution layers to estimate a complex-valued filter for playback suppression and playback estimation, respectively, at S801. The estimates are then applied at S802 on the microphone signal Y to obtain the corresponding outputs, denoted as $\widehat{S+N}$ and D̂.

The LPS of these outputs, together with the fused feature for the first part, are concatenated at S803 and fused to serve as the inputs for the second part 702. Another GRU layer and two 1D convolution layers are utilized to estimate two filters for estimating the playback/noise and target speech from input channels Y, $\widehat{S+N}$, and D̂. The covariance matrix of playback/noise $\hat{\Phi}_{NN}$ and target speech $\hat{\Phi}_{SS}$ are then calculated at S806 for the third part 703.

The third part 703 is for enhancement filter estimation, which is motivated by the idea of multi-channel signal processing. Embodiments regard the input Y and two estimates $\widehat{S+N}$, and D̂ as three-channel inputs and train a self-attentive RNN to estimate the speech enhancement filters $W \in \mathbb{C}^{F \times T \times 3}$. These filters are then applied on the input channels to get the enhanced target speech ŝ. Finally an inverse STFT (iSTFT) is used to get waveform ŝ(t).

The loss function for model training is defined as a combination of scale-invariance signal-to-distortion ratio (SI-SDR) in the time domain and mean absolute error (MAE) of spectrum magnitude in the frequency domain:

$$\text{Loss} = -SI - SDR(\hat{s}, s) + \lambda MAE(|\hat{S}|, |S|) \quad \text{Eq. (5)}$$

where λ is set to 10,000 to balance the value range of the two losses.

Since there may always be a mismatch between the offline training and inference stage of the Deep model. A streaming inference method, in which the output of the processor is looped back and added to the input in the following time steps, is therefore implemented to evaluate the performance of the Deep model in a realistic and recurrent mode. Details of this streaming inference are shown in the example 900 of FIG. 9.

As such, embodiments of this disclosure provide for a deep learning approach to acoustic deterioration suppression. The embodiments address acoustic deterioration suppression by extracting the target signal from microphone recording using an attention based recurrent neural network with properly designed features. With the idea of teacher-forced learning, the Deep model is trained offline using teacher signals and evaluated in both offline and streaming manners to show its performance for acoustic deterioration suppression.

Figure 10:
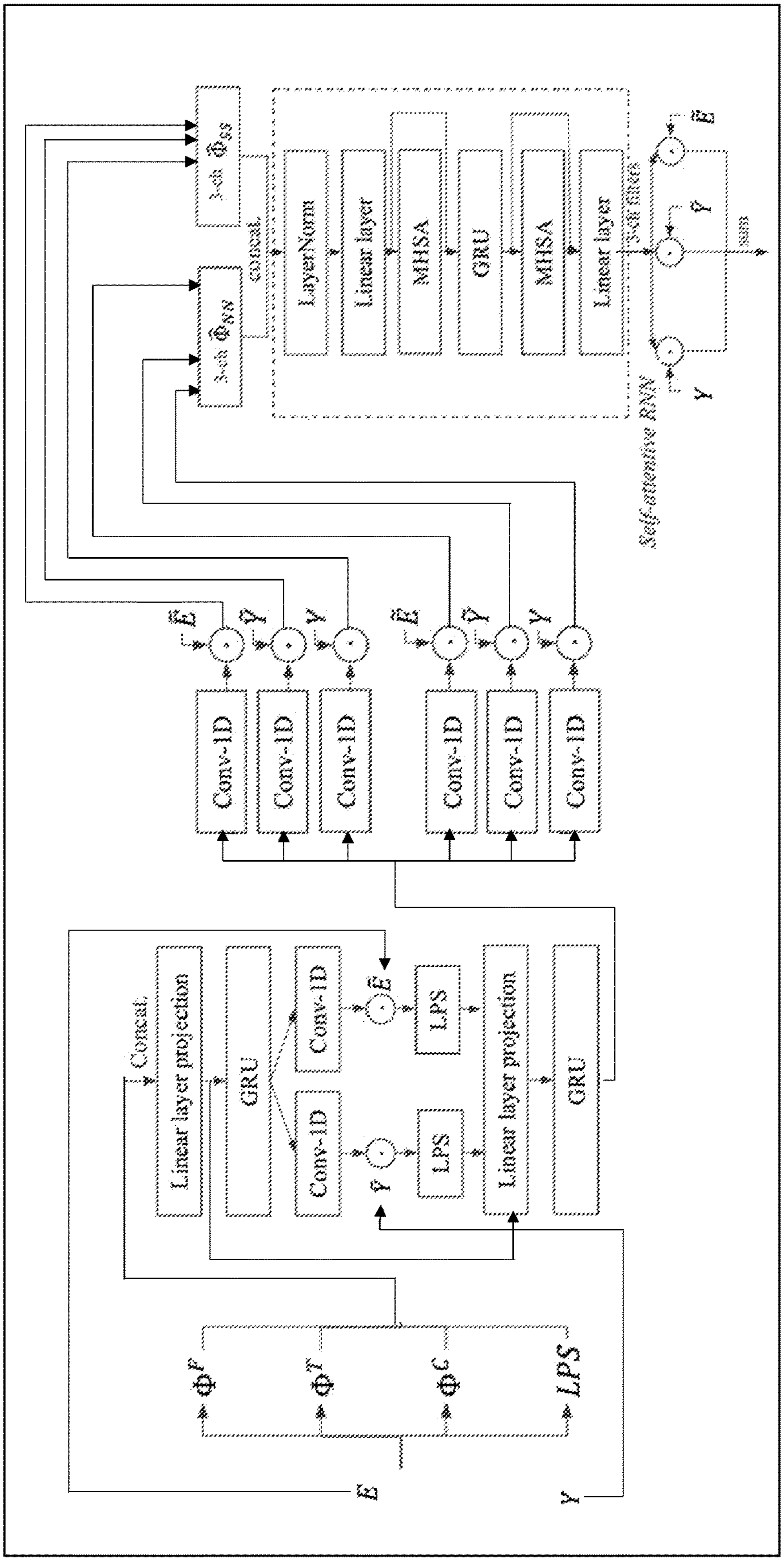
FIG. 10 is a simplified illustration in accordance with embodiments.

FIG. 10 is a signal diagram example 100 of an acoustic amplification system 1001 according to embodiments of the present disclosure.

As shown in FIG. 10, acoustic amplification system 1001 includes of a microphone and a loudspeaker where the target speech is picked up by the microphone as s(t), which is then sent to the loudspeaker for acoustic amplification. The loudspeaker signal x(t) is played out and arrives at the microphone as an acoustic feedback denoted as d(t):

$$d(t) = NL(x(t)) * h(t) \quad \text{Eq. (6)}$$

where NL(•) denotes the nonlinear distortion introduced by the loudspeaker, h(t) represents the acoustic path from loudspeaker to microphone, and * denotes linear convolution.

When the signal is not processed, the playback signal d(t) will re-enter the pickup repeatedly, the corresponding microphone signal can then be represented as:

$$y(t) = s(t) + n(t) + NL[y(t - \Delta t) \cdot G] * h(t) \quad \text{Eq. (7)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound.

In the example 1000 of FIG. 10, a "Conv-1D" outputs a complex-valued ratio filter, which is then applied upon signal*through deep filtering, denoted as ⊙. The intermediate signals mentioned herein may be obtained by applying a filtering to the corresponding original inputs. Specifically, multiple Conv-1D layers may be applied to learn a complex-valued ratio filter and apply it upon the corresponding input signal through deep filtering. The LPS feature of these intermediate signals, together with the original feature may be used for training the following model. In addition, these intermediate signals may be used later for estimating multi-channel noise and speech covariance matrix, are then used for multi-channel deep filtering for obtaining an estimate of the target signal.

Further, despite effectiveness of powerful enhancement baselines, their performance often notably deteriorates in real-world complicated scenarios. For example, the enhanced speech obtained by supervised learning based models in such challenging scenarios may retain strong noise or reverberation, and be accompanied by distortions and artifacts. And for any of those reasons there is therefore a desire for technical solutions to such problems that arose in computer audio technology.

Drawing inspiration from a parallel study in computer vision, which addresses blind face restoration through the regeneration of code tokens within a learned discrete codebook, embodiments herein are motivated by its exceptional robustness against degradation in both synthetic and real-world datasets. Further, discrete representations stored in codebooks have been determined by embodiments herein to be more robust against various interference, and therefore embodiments employ speech codecs to perform speech enhancement.

For example, to address those challenges, embodiments herein provide a novel approach that uses pre-trained generative methods to resynthesize clean, anechoic speech from degraded inputs and leverage pre-trained vocoder and/or codec models to synthesize high-quality speech while enhancing robustness in challenging scenarios. It has been determined that embodiments herein employing generative methods effectively handle information loss in speech signals, resulting in regenerated speech that has improved fidelity and reduced artifacts. By harnessing the capabilities of pre-trained models, embodiments herein have achieve faithful reproduction of the original speech in adverse conditions. The generated speech exhibits enhanced audio quality, reduced background noise, and reverberation. Findings on these embodiments highlight the potential and usefulness of pre-trained generative techniques in speech processing, particularly in scenarios where traditional methods falter.

Figure 11:
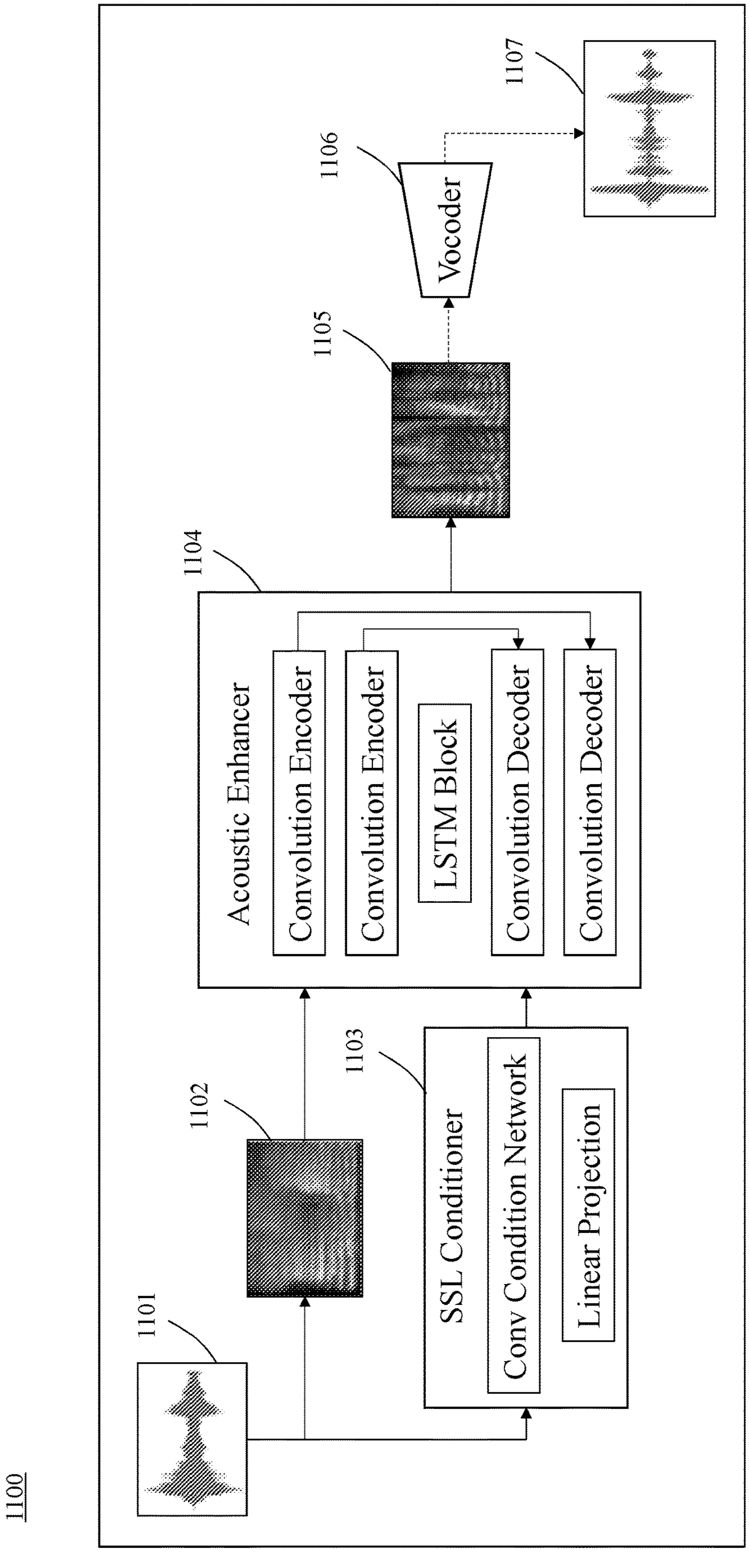
FIG. 11 is a simplified illustration in accordance with embodiments.

As depicted in the example 1100 of FIG. 11, embodiments employ a vocoder approach, wherein a noisy mel-spectrogram 1102 of an input speech signal 1101, which may be noisy and/or reverberant, is transformed into a clean counterpart signal 1107 using an acoustic enhancer. During inference, embodiments use a pretrained HifiGAN vocoder 1106 to restore the clean speech from mel M-hat 1105. An auxiliary input is produced by employing an SSL conditioner 1103 on the SSL features. Specifically, at block 1104, embodiments adopt the WavLM-Large variant of the WavLM model, extract the learnable weighted sum of all layered results to produce 1024-dimension SSL features, which is then processed by the SSL conditioner to extract the SSL embedding of 256 dimensions. This conditioner comprises a three-layer 1-dimensional convolutional network with upsampling, ReLU activation, instance normalization, and a dropout of 0.5. The acoustic enhancer, based on deep complex convolutional recurrent network (DCCRN) architecture, employs a convolutional encoder-decoder with an LSTM bottleneck. Concretely, DCCRN consists of a six-layer convolution encoder and decoder, and an LSTM block in the bottleneck part to model time dependencies. Embodiments adjust the architecture for mel-spectrogram 1102 input by removing all complex-value related operations and setting the input convolutional channels to 1. The auxiliary input is fed to the bottleneck and is concatenated with the input of the LSTM block. To make the training more efficient, the vocoder modules are only used during inference; as illustrated in FIG. 11, the solid arrows represent use in both training and inference, and the dashed arrows represent use only during inference. During training, embodiments calculate the L1 loss between enhanced and clean mel-spectrograms.

Figure 12:
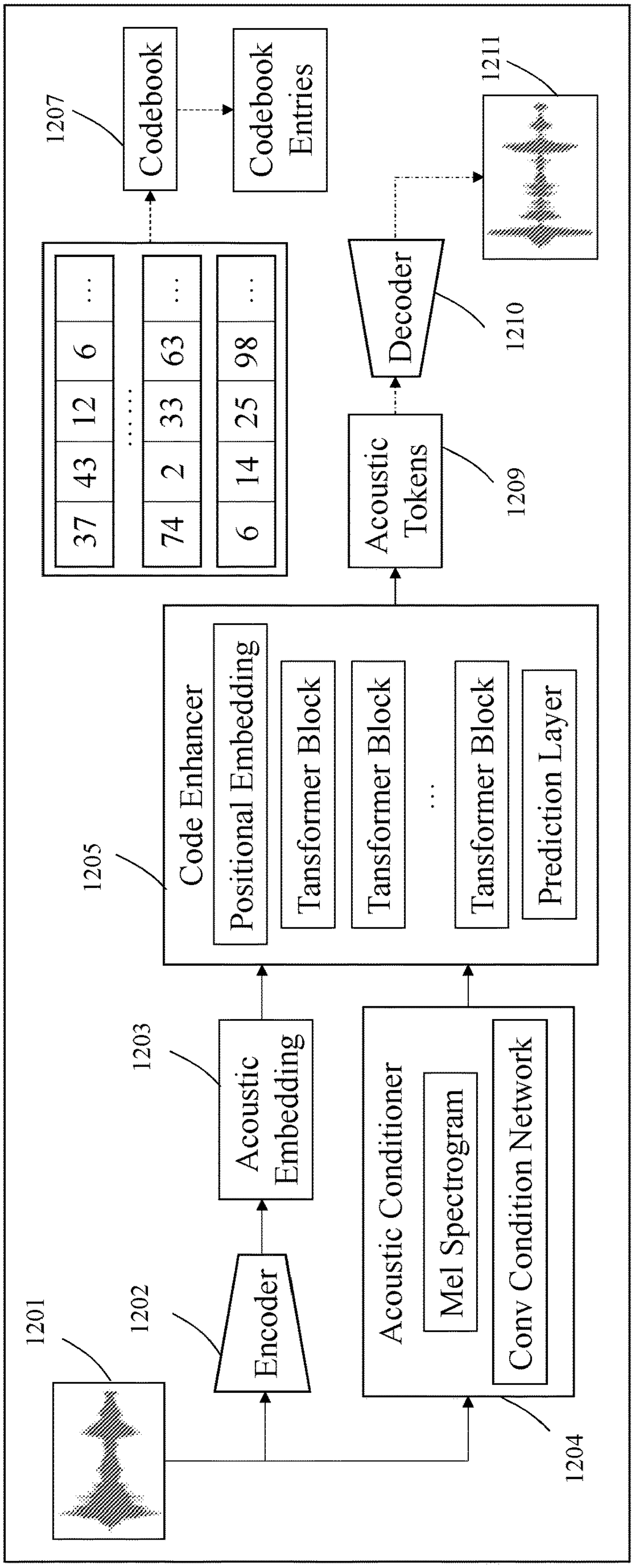
FIG. 12 is a simplified illustration in accordance with embodiments.

Embodiments herein also provide, such as in example 1200 of FIG. 12, a codec approach. The implementation entails the application of supervised enhancement learning within the code token space. This involves attempting to obtain the code tokens 1209 for the target speech 1201 and then using a pretrained speech decoder 1210 to restore the clean speech 1211. The code enhancer architecture 1205 is designed to predict clean code tokens based on the primary input codec embedding 1203 and the auxiliary input mel-spectrograms, such as illustrated in FIG. 11. This undertaking is similar to a classification task focusing on code tokens.

Initial attempts to predict tokens corresponding to clean speech encountered challenges. Firstly, feature encoders of existing codecs are not trained using degraded speech utterances. This inconsistency between the corrupted features of the codec input and the accurate derivation of code tokens by the codec led to instability in input code tokens, thereby yielding suboptimal enhancement outcomes. Furthermore, predicting speech embeddings (either pre-vector quantization or post-vector quantization) is comparatively simpler. However, the generated speech by the decoder may contain distortions, as the predicted embeddings may not align well with the pre-stored patterns in the codebooks, consequently affecting enhancement performance.

To address these issues, embodiments provide, a generalized codec architecture, such as in example 1200, involving a EnCodec trained on utterances from multiple languages retrieved from gigaspeech, LibriTTS, and VP10K and common voice, and augmented with 20% probabilities by simulated noise and reverberations. Additionally, encoder 1202 embeddings 1203 are employed as primary inputs during training, alongside mel-spectrograms, from conditioner 1204, of the input speech 1201 as auxiliary input. Given the importance of the first code index and the hierarchical architecture inherent in residual quantization, an architecture 1205 based on layer-wise modeling is adopted to enhance performance. The model architecture 1205 comprises a transformer decoder and a prediction layer. This transformer decoder integrates 12 transformer blocks, characterized by an embedding dimension of 512. The model input encompasses the codec embedding 1203 and the auxiliary input acoustic conditioner 1204 embedding. For the prediction of second to last code tokens, an additional embedding generated from preceding code tokens is incorporated. The prediction layer facilitates the projection of transformer outputs to 1024 dimensions, which corresponds to the size of the codebook 1207 vocabulary.

Accordingly, by those pipelines, there is provided leveraging of pre-trained generative methods for speech enhancement, use of vocoder and codec models for high-quality speech synthesis, and effectively handling of information loss in speech signals. According to embodiments, there is produces speech with improved fidelity and fewer artifacts and with focus on faithful reproduction of the original speech even in adverse conditions.

Embodiments herein provide for resynthesizing of clean, anechoic speech from degraded inputs along with use of pre-trained models to harness existing semantic or acoustic information while also processing a main input and an auxiliary input to enhance intermediate representations in any of two pipelines: vocoder and codec. Thereby, embodiments, employs an acoustic enhancer to transform noisy mel-spectrograms and embedding into clean mel-spectrogram or code and utilize the capabilities of generative methods to address situations with significant information loss in speech signals.

Embodiments herein are employed in situations where speech signals are degraded by background noise and room reverberation which present otherwise challenging scenarios where traditional speech enhancement methods falter and also real-world situations where there is a requirement for faithful reproduction of original speech.

Therefore, it is shown herein that embodiments provide an innovative approach that leverages pre-trained generative methods to address the longstanding challenges of enhancing speech signal quality in adverse acoustic environments. By employing established vocoder, codec, and self-supervised learning models, the embodiments herein effectively resynthesize clean and anechoic speech from degraded inputs, mitigating issues like background noise and reverberation. Through empirical evaluations in both simulated and real-world scenarios, the embodiments herein demonstrate superior subjective scores, showcasing its ability to improve audio fidelity, reduce artifacts, and superior robustness which highlights the potential of leveraging generative techniques in speech processing, especially in challenging scenarios where conventional methods fall short.

The techniques described above, can be implemented as computer software using computer-readable instructions and physically stored in one or more computer-readable media or by a specifically configured one or more hardware processors. For example, FIG. 13 shows a computer system 1300 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
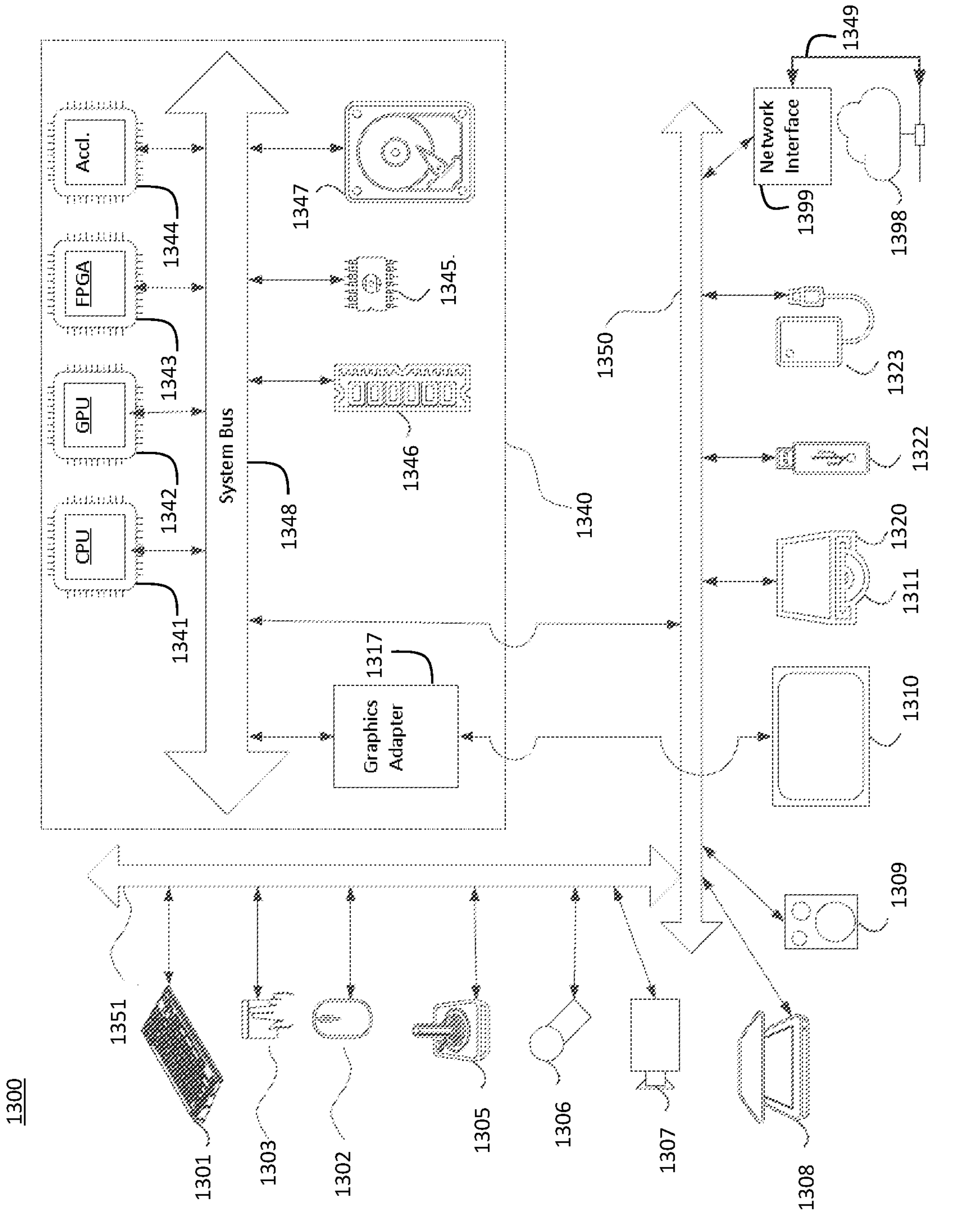
FIG. 13 is a simplified illustration in accordance with embodiments.

The components shown in FIG. 13 for computer system 1300 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1300.

Computer system 1300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1301, mouse 1302, trackpad 1303, touch screen 1310, joystick 1305, microphone 1306, scanner 1308, camera 1307.

Computer system 1300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1310, or joystick 1305, but there can also be tactile feedback devices that do not serve as input devices), audio output devices (such as: speakers 1309, headphones (not depicted)), visual output devices (such as screens 1310 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1300 can also include human accessible storage devices and their associated media such as optical media including CD/DVD ROM/RW 1320 with CD/DVD 1311 or the like media, thumb-drive 1322, removable hard drive or solid state drive 1323, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1300 can also include interface 1399 to one or more communication networks 1398. Networks 1398 can for example be wireless, wireline, optical. Networks 1398 can further be local, wide-area, metropolitan, vehicular and industrial, real-time, delay-tolerant, and so on. Examples of networks 1398 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1398 commonly require external network interface adapters that attached to certain general-purpose data ports or peripheral buses (1350 and 1351) (such as, for example USB ports of the computer system 1300; others are commonly integrated into the core of the computer system 1300 by attachment to a system bus as described below (for example Ethernet interface into a PC computer system or cellular network interface into a smartphone computer system). Using any of these networks 1398, computer system 1300 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1340 of the computer system 1300.

The core 1340 can include one or more Central Processing Units (CPU) 1341, Graphics Processing Units (GPU) 1342, a graphics adapter 1317, specialized programmable processing units in the form of Field Programmable Gate Areas (FPGA) 1343, hardware accelerators for certain tasks 1344, and so forth. These devices, along with Read-only memory (ROM) 1345, Random-access memory 1346, internal mass storage such as internal non-user accessible hard drives, SSDs, and the like 1347, may be connected through a system bus 1348. In some computer systems, the system bus 1348 can be accessible in the form of one or more physical plugs to enable extensions by additional CPUs, GPU, and the like. The peripheral devices can be attached either directly to the core's system bus 1348, or through a peripheral bus 1349. Architectures for a peripheral bus include PCI, USB, and the like.

CPUs 1341, GPUs 1342, FPGAs 1343, and accelerators 1344 can execute certain instructions that, in combination, can make up the aforementioned computer code. That computer code can be stored in ROM 1345 or RAM 1346. Transitional data can be also be stored in RAM 1346, whereas permanent data can be stored for example, in the internal mass storage 1347. Fast storage and retrieval to any of the memory devices can be enabled through the use of cache memory, that can be closely associated with one or more CPU 1341, GPU 1342, mass storage 1347, ROM 1345, RAM 1346, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1300, and specifically the core 1340 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1340 that are of non-transitory nature, such as core-internal mass storage 1347 or ROM 1345. The software implementing various embodiments of the present disclosure can be stored in such devices and executed by core 1340. A computer-readable medium can include one or more memory devices or chips, according to particular needs. The software can cause the core 1340 and specifically the processors therein (including CPU, GPU, FPGA, and the like) to execute particular processes or particular parts of particular processes described herein, including defining data structures stored in RAM 1346 and modifying such data structures according to the processes defined by the software. In addition or as an alternative, the computer system can provide functionality as a result of logic hardwired or otherwise embodied in a circuit (for example: accelerator 1344), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor and comprising:

receiving an audio signal obtained from a microphone;

inputting the audio signal into a neural-network pipeline, the neural-network pipeline comprising a convolutional network that receives the audio signal and provides a first output of the convolutional network to an enhancer, the enhancer comprising a deep complex convolutional recurrent network that receives the first output along with a mel spectrogram of the audio signal and outputs a second output to at least one of a vocoder and a decoder; and controlling an output of an enhanced audio signal from the at least one of the vocoder and the decoder.

2. The method according to claim 1, wherein the vocoder is a HifiGAN vocoder.

3. The method according to claim 1, wherein the first output is based on a WavLM-Large variant of an WavLM model which extracts a learnable weighted sum of layered results and produces a 1024-dimension self-supervised learning (SSL) features from which SSL embeddings of 256 dimensions are extracted by an SSL conditioner of the neural-network pipeline.

4. The method according to claim 3, wherein the SSL conditioner comprises a three-layer 1-dimensional convolutional network, as the convolutional network, comprising upsampling, rectified linear unit activation, instance normalization, and a dropout of 0.5.

5. The method according to claim 1, wherein the deep complex convolutional recurrent network comprises an encoder-decoder with a long short-term memory (LSTM) bottleneck, and wherein the encoder-decoder comprises a six-layer convolutional network.

6. The method according to claim 1, wherein the neural-network pipeline comprises a model trained on utterances from multiple languages.

7. The method according to claim 6, wherein the utterances comprise augmentations of simulated noise and reverberations.

8. The method according to claim 6, wherein encoder embeddings and the mel spectrogram are inputs to the model during training of the model.

9. The method according to claim 1, wherein neural-network pipeline comprises a decoder comprising 12 transformer blocks characterized by an embedding dimension of 512.

10. The method according to claim 9, wherein a prediction layer of the neural-network pipeline comprises projection of transformer outputs to 1024 dimensions as corresponding to a size of a codebook vocabulary of the neural-network pipeline.

11. An apparatus comprising:

at least one memory configured to store computer program code;

at least one processor configured to access the computer program code and operate as instructed by the computer program code, the computer program code including:

receiving code configured to cause the at least one processor to receive an audio signal obtained from a microphone;

inputting code configured to cause the at least one processor to input the audio signal into a neural-network pipeline, the neural-network pipeline comprising a convolutional network that receives the audio signal and provides a first output of the convolutional network to an enhancer, the enhancer comprising a deep complex convolutional recurrent network that receives the first output along with a mel spectrogram of the audio signal and outputs a second output to at least one of a vocoder and a decoder; and controlling code configured to cause the at least one processor to control an output of an enhanced audio signal from the at least one of the vocoder and the decoder.

12. The apparatus according to claim 11, wherein the vocoder is a HifiGAN vocoder.

13. The apparatus according to claim 11, wherein the first output is based on a WavLM-Large variant of an WavLM model which extracts a learnable weighted sum of layered results and produces a 1024-dimension self-supervised learning (SSL) features from which SSL embeddings of 256 dimensions are extracted by an SSL conditioner of the neural-network pipeline.

14. The apparatus according to claim 13, wherein the SSL conditioner comprises a three-layer 1-dimensional convolutional network, as the convolutional network, comprising upsampling, rectified linear unit activation, instance normalization, and a dropout of 0.5.

15. The apparatus according to claim 11, wherein the deep complex convolutional recurrent network comprises an encoder-decoder with a long short-term memory (LSTM) bottleneck, and wherein the encoder-decoder comprises a six-layer convolutional network.

16. The apparatus according to claim 11, wherein the neural-network pipeline comprises a model trained on utterances from multiple languages.

17. The apparatus according to claim 16, wherein the utterances comprise augmentations of simulated noise and reverberations.

18. The apparatus according to claim 16, wherein encoder embeddings and the mel spectrogram are inputs to the model during training of the model.

19. The apparatus according to claim 11, wherein neural-network pipeline comprises a decoder comprising 12 transformer blocks characterized by an embedding dimension of 512, and wherein a prediction layer of the neural-network pipeline comprises projection of transformer outputs to 1024 dimensions as corresponding to a size of a codebook vocabulary of the neural-network pipeline.

20. A non-transitory computer readable medium storing a program causing a computer to:

receive an audio signal obtained from a microphone;

input the audio signal into a neural-network pipeline, the neural-network pipeline comprising a convolutional network that receives the audio signal and provides a first output of the convolutional network to an enhancer, the enhancer comprising a deep complex convolutional recurrent network that receives the first output along with a mel spectrogram of the audio signal and outputs a second output to at least one of a vocoder and a decoder; and control an output of an enhanced audio signal from the at least one of the vocoder and the decoder.

* * * * *